# (12) United States Patent
Wu

(10) Patent No.: US 8,062,752 B2
(45) Date of Patent: Nov. 22, 2011

(54) CYCLO OLEFIN POLYMER CONTAINING INTERMEDIATE TRANSFER MEMBERS

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/749,547

(22) Filed: Mar. 30, 2010

(65) Prior Publication Data

US 2011/0244249 A1    Oct. 6, 2011

(51) Int. Cl.
  *B32B 27/08* (2006.01)
  *B32B 27/24* (2006.01)
  *B23B 27/32* (2006.01)
  *G03G 15/14* (2006.01)

(52) U.S. Cl. ........ 428/421; 428/422; 428/447; 428/523; 399/308

(58) Field of Classification Search .......... None
  See application file for complete search history.

(56) References Cited

U.S. PATENT DOCUMENTS

| | | | |
|---|---|---|---|
| 5,487,707 A | 1/1996 | Sharf et al. | |
| 5,978,639 A * | 11/1999 | Masuda et al. | 399/302 |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,602,156 B2 | 8/2003 | Schlueter, Jr. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 2009/0297232 A1 | 12/2009 | Wu | |

FOREIGN PATENT DOCUMENTS

JP    2001133999 A   *  5/2001

OTHER PUBLICATIONS

Machine translation of JP 2001-133999 A, May 2001.*
English translation of JP 2001-133999 (Inoue et al.), May 2001.*
Jin Wu, U.S. Appl. No. 12/413,633 on Fluorinated Sulfonic Acid Polymer Grafted Polyaniline Containing Intermediate Transfer Members, filed Mar. 30, 2009.
Jin Wu, U.S. Appl. No. 12/413,638 on Perfluoropolyether Polymer Grafted Polyaniline Containing Intermediate Transfer Members, filed Mar. 30, 2009.
Jin Wu, U.S. Appl. No. 12/413,642 on Fluorotelomer Grafted Polyaniline Containing Intermediate Transfer Members, filed Mar. 30, 2009.
Jin Wu et al., U.S. Appl. No. 12/200,147 on Coated Seamed Transfer Member, filed Aug. 28, 2008.
Jin Wu et al., U.S. Appl. No. 12/200,179 on Coated Transfer Member, filed Aug. 28, 2008.
Jin Wu et al., U.S. Appl. No. 12/749,539 on Fluoropolyimide Single Layered Intermediate Transfer Members, filed Mar. 30, 2010.
Jin Wu et al., U.S. Appl. No. 12/749,545 on Fluoropolyimide Intermediate Transfer Members, filed Mar. 30, 2010.
Jin Wu et al., U.S. Appl. No. 12/749,548 on Silane Acrylate Containing Intermediate Transfer Members, filed Mar. 30, 2010.

* cited by examiner

*Primary Examiner* — Ramsey Zacharia
(74) *Attorney, Agent, or Firm* — Oliff & Berridge, PLC

(57) ABSTRACT

An intermediate transfer media, such as a belt, that includes a cyclo olefin polymer.

16 Claims, No Drawings

CYCLO OLEFIN POLYMER CONTAINING INTERMEDIATE TRANSFER MEMBERS

CROSS REFERENCE TO APPLICATIONS

Copending U.S. application Ser. No. 12/749,539, filed Mar. 30, 2010, entitled Fluoropolyimide Single Layered Intermediate Transfer Members, the disclosure of which is totally incorporated herein by reference, illustrates an intermediate transfer member comprised of a fluoropolyimide.

Copending U.S. application Ser. No. 12/749,545, filed Mar. 30, 2010, entitled Fluoropolyimide Intermediate Transfer Members, the disclosure of which is totally incorporated herein by reference, illustrates an intermediate transfer member comprised of a polyimide substrate, and thereover a fluoropolyimide.

Copending U.S. application Ser. No. 12/749,648, filed Mar. 30, 2010, entitled Silane Acrylate Containing Intermediate Transfer Members, the disclosure of which is totally incorporated herein by reference, illustrates an intermediate transfer member comprised of an optional supporting substrate, and in the form of a layer a mixture of a carbon nanotube, a photoinitiator, and a hybrid component formed by the reaction of a bisphenol and a silane acrylate.

Copending U.S. application Ser. No. 12/413,633, U.S. Publication No. 20100249322, filed Mar. 30, 2009, entitled Fluorinated Sulfonic Acid Polymer Grafted Polyaniline Containing Intermediate Transfer Members, illustrates an intermediate transfer member comprised of a substrate, and in contact therewith a polyaniline having grafted thereto a fluorinated sulfonic acid polymer.

Copending U.S. application Ser. No. 12/413,638, U.S. Publication No. 20100247918, filed Mar. 30, 2009, entitled Perfluoropolyether Polymer Grafted Polyaniline Containing Intermediate Transfer Members illustrates an intermediate transfer member comprised of a substrate and in contact with the substrate a polyaniline grafted perfluoropolyether phosphoric acid polymer.

Copending U.S. application Ser. No. 12/413,642, U.S. Publication No. 20100247919, filed Mar. 30, 2009, entitled Fluorotelomer Grafted Polyaniline Containing Intermediate Transfer Members, illustrates an intermediate transfer member comprised of a substrate, and a layer comprised of polyaniline having grafted thereto a fluorotelomer.

Illustrated in U.S. application Ser. No. 12/129,995, U.S. Publication No. 20090297232, filed May 30, 2008, entitled Polyimide Intermediate Transfer Components, is an intermediate transfer belt comprised of a substrate comprising a polyimide and a conductive component wherein the polyimide is cured at a temperature of from about 175 to about 290° C. over a period of time of from about 10 to about 120 minutes.

Illustrated in U.S. application Ser. No. 12/200,147 filed Aug. 28, 2008, entitled Coated Seamed Transfer Member, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179, U.S. Publication No. 20100051171, filed Aug. 28, 2008, entitled Coated Transfer Member, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

BACKGROUND

Disclosed are intermediate transfer members, and more specifically, intermediate transfer members selected for the transfer of developed images in an electrostatographic, for example xerographic, including digital, image on image, and the like, machines or apparatuses, and printers, inclusive of office printers, production printers, and the like. In embodiments, there are selected intermediate transfer members comprised of a cyclo olefin polymer, which is commercially available. In embodiments thereof, the cyclo olefin polymer is dispersed in or mixed with a suitable solvent, such as those illustrated herein, like an aromatic solvent, such as toluene, or an aliphatic solvent, such as cyclohexane, and then solution casted to form the intermediate transfer member. Also, in embodiments, the cyclo olefin polymer is extruded via a known extrusion machine to form the intermediate transfer member.

A number of advantages are associated with the intermediate transfer members, such as belts (ITB) of the present disclosure, and, in embodiments, where the cyclo olefin intermediate transfer member (ITM), such as an intermediate transfer belt, can be generated by extrusion molding or solution casting, and more specifically, extrusion molding; where the ITM possess functional resistivity, excellent modulus, and excellent break strength; an acceptable thermal expansion coefficient (CTE) and an acceptable hygroscopic expansion coefficient (CHE), primarily because the cyclo olefin polymer (COP) itself has very low water absorption characteristics of less than about 0.01 percent, and as comparison, other common ITM polymers, such as polycarbonate, has a water absorption of about 0.22 percent, and polyethylene terephthalate has a water absorption of about 0.11 percent; wear and abrasion resistance; and low and acceptable surface friction characteristics for aiding in the transfer of developed xerographic images.

In a typical electrostatographic reproducing apparatus, a light image of an original to be duplicated is recorded in the form of an electrostatic latent image upon a photoconductor member, and the latent image is subsequently rendered visible by the application of electroscopic thermoplastic resin particles and colorant. Generally, the electrostatic latent image is developed by utilizing a developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles of the developer are deposited thereon in image configuration. Subsequently, the developed image is transferred to a supporting substrate like paper. It is advantageous to transfer the developed image to an intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members may possess a number of advantages, such as enabling high throughput at modest process speeds; improving registration of the final color toner image in color systems using synchronous development of one or more component colors and using one or more transfer stations; and increasing the number of substrates that can be selected. However, a disadvantage of using an intermediate transfer member is that a plurality of transfer operations is usually needed allowing for the possibility of charge exchange occurring between toner particles and the transfer member which ultimately can lead to less than complete toner transfer, resulting in low resolution images on the image receiving substrate, and image deterioration. When the image is in color, the image can additionally suffer from color shifting and color deterioration.

Therefore, in embodiments, it is desired to provide an intermediate transfer member, which has excellent transfer capabilities; for example, to an intermediate transfer member where a cyclo olefin polymer is absent; and possesses excellent humidity insensitivity characteristics leading to high copy quality where developed images with minimal resolution issues can be obtained. It is also desired to provide a weldable intermediate transfer belt that may not, but could, have puzzle cut seams, and instead, has a weldable seam, thereby providing a belt that can be manufactured without labor intensive steps, such as manually piecing together the puzzle cut seam with fingers, and without the lengthy high temperature and high humidity conditioning steps. It is also desired to provide an intermediate transfer member, which has excellent wear and abrasion resistance, and more specifically, has excellent mechanical properties as compared, for example, to an intermediate transfer member where a cyclo olefin polymer is absent. Moreover, there is a need to provide intermediate transfer members where there can be selected for the preparation thereof known extrusion and known solution processes.

REFERENCES

Illustrated in U.S. Pat. No. 7,031,647 is an imageable seamed belt containing a lignin sulfonic acid doped polyaniline.

Attempts at controlling the resistivity of intermediate transfer members by, for example, adding conductive fillers, such as ionic additives and/or carbon black to the outer layer, are disclosed in U.S. Pat. No. 6,397,034 which describes the use of a treated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties and poor mechanical properties.

Illustrated in U.S. Pat. No. 7,139,519 is an intermediate transfer belt comprising a belt substrate comprising primarily at least one polyimide polymer, and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is usually labor intensive and costly, and the puzzle cut seam, in embodiments, is sometimes weak. The manufacturing process for a puzzle cut seamed belt usually involves a lengthy in time high temperature and a high humidity conditioning step. For the conditioning step, each individual belt is rough cut, rolled up, and placed in a conditioning chamber that is environmentally controlled at about 45° C. and about 85 percent relative humidity for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

It is known that carbon black can be used as the conductive particles in several intermediate transfer belts, however, carbon black can be difficult to disperse since there are very few polar groups on the surface, and unless they are specially modified on the surface. Also, it can be difficult to generate carbon black based ITBs with consistent resistivity because the required loading is present on the vertical part of the percolation curve and the working window for carbon black is very narrow, and is difficult for a robust manufacturing process. In addition, in humid environments, moisture will tend to deposit on the ITB during idle and cause wrinkles induced transfer failures and print defects.

SUMMARY

In embodiments, there is disclosed an intermediate transfer member comprised of a substrate comprising a cyclo olefin polymer; an intermediate transfer member, such as an intermediate belt comprised of a supporting substrate such as a polyimide, and a layer thereover comprising a cyclo olefin polymer; an intermediate transfer member wherein the resistivity thereof is from about $10^8$ to about $10^{13}$ ohm/square, from about $10^9$ to about $10^{12}$ ohm/square, and more specifically, from about $10^{10}$ to about $10^{12}$ ohm/square.

In addition, the present disclosure provides, in embodiments, an apparatus for forming images on a recording medium comprising a charge retentive surface to receive an electrostatic latent image thereon; a development component to apply toner to the charge retentive surface to develop the electrostatic latent image and to form a developed image on the charge retentive surface; a weldable intermediate cyclo olefin polymer transfer belt to transfer the developed image from the charge retentive surface to a substrate, and a fixing component.

DETAILED DESCRIPTION

Aspects of the present disclosure relate to an intermediate transfer member comprised of a cyclo olefin polymer; an intermediate transfer member comprised of a supporting substrate first layer, and a cyclo olefin polymer second layer present on the first layer, and wherein the cyclo olefin polymer is a polymer of dicyclopentadiene, or a copolymer of ethylene and norbornene, and which polymer possesses a number average molecular weight of from about 1,000 to about 1,000,000; an intermediate transfer belt comprised of a supporting substrate first layer, and a cyclo olefin thermoplastic polymer second layer present on the first layer, and wherein the cyclo olefin polymer is a polymer of dicyclopentadiene or a copolymer of ethylene and norbornene, and wherein the cyclo olefin polymer has a glass transition temperature of from about 70° C. to about 200° C., and possesses a number average molecular weight of from about 1,000 to about 1,000,000; an intermediate transfer member comprised of a cyclo olefin thermoplastic polymer, a conductive component, an adhesive layer, and a release top layer in contact with the cyclo olefin polymer in the form of a layer; a transfer media comprised of a cyclo olefin polymer and a polymeric binder; and an apparatus for forming images on a recording medium comprising a charge retentive surface to receive an electrostatic latent image thereon; a development component to apply toner to the charge retentive surface to develop the electrostatic latent image, and to form a developed image on the charge retentive surface; and an intermediate transfer member comprised of a supporting substrate like a polymer, and a layer thereover comprising a cyclo olefin polymer, and an optional conductive component such as carbon black; an intermediate transfer member where the cyclo olefin polymer is represented by

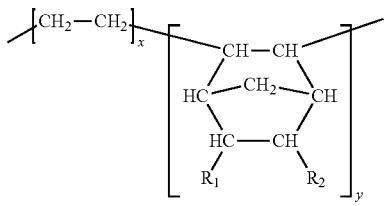

wherein x and y each represents the mole percent of the repeating segments and each R is hydrogen, alkyl or substituted alkyl, and more specifically, for the above formula wherein x is, for example, from about 1 to about 50 mole percent, y is, for example, from about 50 to about 99 mole percent, alkyl or substituted alkyl contain, for example, from 1 to about 24, from 1 to about 18, from 1 to about 10, from 1 to about 6, or from 1 to about 4 carbon atoms; and also where x is, for example, from about 1 to about 20 mole percent, y is, for example, from about 80 to about 99 mole percent, and alkyl or substituted alkyl contains, for example, from 1 to about 24, from 1 to about 12, or from 1 to about 6 carbon atoms.

CYCLO OLEFIN POLYMER EXAMPLES

A number of cyclo olefin polymers are envisioned for the ITM of the present disclosure, such as known cyclo olefin polymers and cyclo olefin polymers available from Zeon Corporation, such as for example, ZEONEX® and ZEONOR®, Topas Advanced Polymers, such as for example TOPAS®, and Mitsui Chemical America, Inc. APEL™. The cyclo olefin polymers selected for the ITM of the present disclosure, which polymers are also referred to as poly(cyclo olefins) are, in embodiments, prepared by the polymerization of dicyclopentadiene or the copolymerization of ethylene and norbornene.

The cyclo olefin polymer selected is, in embodiments, of the following formulas/structures

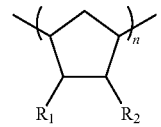

wherein n represents the number of repeating segments, and each R is hydrogen, alkyl, or substituted alkyl; and more specifically, where n is a number of from about 20 to about 20,000, and the alkyl or substituted alkyl contains from 1 to about 24 carbon atoms, or where the alkyl or substituted alkyl contains from 1 to about 12 carbon atoms; n is a number of from about 200 to about 6,000; and wherein the cyclo olefin polymer is of a weight average molecular weight of from about 1,500 to about 5,000,000, and a number average molecular weight of from about 1,000 about to about 1,000,000, or wherein the cyclo olefin polymer is of a weight average molecular weight of from about 15,000 to about 1,500,000, and a number average molecular weight of from about 10,000 to about 300,000.

In embodiments, the cyclo olefin polymer possesses, for example, a glass transition temperature (determined by Differential Scanning calorimetry) of from about 70° C. to about 200° C., or from about 100° C. to about 170° C.; and a water absorption (measured using ASTM D570) of less than 0.01 percent, such as about 0.001 to about 0.01 percent.

Examples of the dicyclopentadiene cyclo olefin polymers include ZEONOR® 750R ($T_g$=70° C.), 1020R ($T_g$=105° C.), 1060R ($T_g$=100° C.), 1420R ($T_g$=136° C.), and 1600R ($T_g$=163° C.); ZEONEX® 480 ($T_g$=138° C.), 480R ($T_g$=138° C.), 280R ($T_g$=138° C.), 490K ($T_g$=140° C.), E48R ($T_g$=139° C.), E28R ($T_g$=139° C.), and RS820 ($T_g$=138° C.), all commercially available from Zeon Corporation.

Examples of the ethylene and norbornene cyclo olefin polymers include TOPAS® 6017S-04 ($T_g$=80° C.), 6015S-04 ($T_g$=80° C.), TKX-001 ($T_g$=136° C.), 8007X10 ($T_g$=80° C.), and 8007S-04 ($T_g$=80° C.), all commercially available from Topas Advanced Polymers; APEL™ APL8008T ($T_g$=70° C.), APL6509T ($T_g$=80° C.), APL6011T ($T_g$=105° C.), APL6013T ($T_g$=125° C.), APL6015T ($T_g$=145° C.), APL5014DP ($T_g$=135° C.), and APL5514ML ($T_g$=135° C.), all commercially available from Mitsui Chemical America, Inc., and encompassed by the formulas/structures illustrated herein for the cyclo olefin polymers.

Various amounts of cyclo olefin polymers can be selected for the solution casting or for the extrusion process preparation of the ITM, such as for example, from about 40 to about 99 weight percent, from 60 to about 95 weight percent, from 70 to about 90 weight percent based on the percentage of components present.

LAYER EXAMPLES

Specific examples of supporting substrates include polyimides, polyamideimides, polyetherimides, and mixtures thereof.

More specifically, examples of the intermediate transfer member supporting substrates of a thickness, for example, of from 10 to about 300 microns, from 50 to about 150 microns, from 75 to about 125 microns, are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180° C. to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can cured at temperatures of above 300° C., such as PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Also, polyimides that may be selected as the supporting substrate may be prepared as fully imidized polymers which do not contain any "amic" acid, and do not require high temperature cure to convert them to the imide form. A typical polyimide of this type may be prepared by reacting di-(2,3-dicarboxyphenyl)-ether dianhydride with 5-amino-1-(p-aminophenyl)-1,3,3-trimethylindane. This polymer is available as Polyimide XU 218 sold by Ciba-Geigy Corporation, Ardsley, N.Y. Other fully imidized polyimides are available from Lenzing Corporation in Dallas, Tex., and are sold as Lenzing P83 polyimide, and by Mitsui Toatsu Chemicals, New York, N.Y. sold as Larc-TPI.

Examples of specific selected thermoplastic polyimide supporting substrates are KAPTON® KJ, commercially available from E.I. DuPont, Wilmington, Del., as represented by

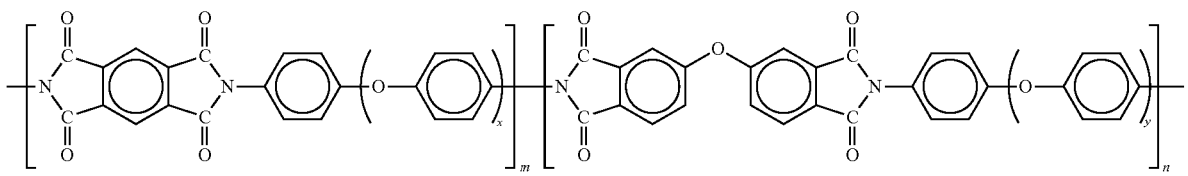

wherein x is equal to 2; y is equal to 2; m and n are from about 10 to about 300; and IMIDEX®, commercially available from West Lake Plastic Company, as represented by

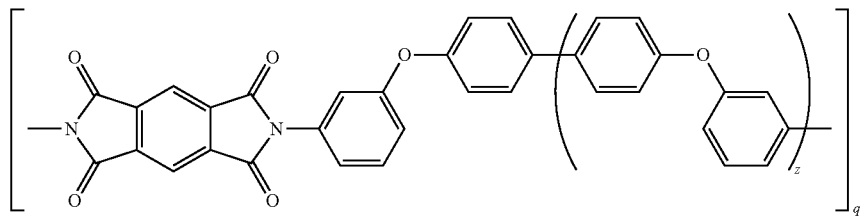

Examples of polyamideimides that can be used as supporting substrates are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® Al-10 ($T_g$=272° C.), commercially available from Solvay Advanced Polymers, LLC, Alpharetta, Ga.

Examples of polyetherimide supporting substrates are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), wherein z is equal to 1, and q is from about 10 to about 300.

In embodiments, the cyclo olefin polymer can be mixed/milled with a carbon black and the solvents, such as cyclohexane and toluene, and then the resulting dispersion mixture can be applied to or coated on a biaxially oriented poly(ethylene naphthalate) (PEN) substrate (KALEDEX™ 2000) having a known thickness of, for example, about 3.5 mils using known draw bar coating methods. The resulting film or films can be dried at high temperatures, such as from about 60° C. to about 140° C., or from about 100° C. to about 120° C. for a sufficient period of time, such as for example, from about 1 to about 30 minutes, or from about 5 to about 15 minutes while remaining on the PEN substrate. After drying and cooling to room temperature, about 23° C. to about 25° C., the film or films on the PEN substrate or separate PEN substrates are automatically released from the substrate resulting in the functional intermediate transfer member or members as disclosed herein.

Conductive components, such as a carbon black, a polyaniline or a metal oxide, may be present in the intermediate transfer member supporting substrate, and in the cyclo olefin polymer layer in, for example, an amount of from about 1 to about 60 weight percent, from about 5 to about 40 weight percent, or specifically from about 10 to about 30 weight percent.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is dependent on surface area and its structure primarily. Generally, the higher the surface area and the higher the structure, the more conductive is the carbon black. Surface area is measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); Channel carbon blacks available from Evonik-Degussa; Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 m$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers).

In embodiments, the polyaniline conductive component selected has a relatively small particle size of, for example, from about 0.5 to about 5 microns, from about 1.1 to about 2.3 microns, from about 1.2 to about 2 microns, from about 1.5 to about 1.9 microns, or about 1.7 microns. Specific examples of polyanilines selected for the overcoat layer are PANIPOL™ F, commercially available from Panipol Oy, Finland; and lignosulfonic acid grafted polyaniline.

Examples of metal oxides selected as a conductive component for the ITM include tin oxide, antimony doped tin oxide, indium oxide, indium tin oxide, zinc oxide, and titanium oxide.

The disclosed intermediate transfer members are, in embodiments, weldable, that is the seam of the member, like a belt, is weldable, and more specifically, may be ultrasonically welded to produce a seam. The surface resistivity of the disclosed intermediate transfer member is, for example, from about $10^9$ to about $10^{13}$ ohm/square, or from about $10^{10}$ to about $10^{12}$ ohm/square. The sheet resistivity of the intermediate transfer weldable member is, for example, from about $10^9$ to about $10^{13}$ ohm/square, or from about $10^{10}$ to about $10^{12}$ ohm/square.

The intermediate transfer members illustrated herein, like intermediate transfer belts, can be selected for a number of printing and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer, or can be comprised of several layers, such as from about 2 to about 5 layers. In embodiments, the intermediate transfer member further includes an outer release layer.

Optional release layer examples situated on and in contact with the cyclo olefin polymer polymeric binder layer include low surface energy materials, such as TEFLON®-like materials including fluorinated ethylene propylene copolymer (FEP), polytetrafluoroethylene (PTFE), polyfluoroalkoxy polytetrafluoroethylene (PFA TEFLON®) and other TEFLON®-like materials; silicone materials such as fluorosilicones, and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

The release layer or layers of from about 1 to about 100 microns, or from about 10 to about 50 microns may be deposited on the cyclo olefin polymer by well known coating processes. Known methods for forming the outer layer(s) on the substrate film, such as dipping, spraying such as by multiple spray applications of very thin films, casting, flow-coating, web-coating, roll-coating, extrusion, molding, or the like, can be used. Usually it is desirable to deposit the layers by spraying such as by multiple spray applications of very thin films, casting, by web coating, by flow-coating and specifically by laminating.

Adhesive layer components usually situated between the supporting substrate, and the cyclo olefin polymer thereover include, for example, a number of resins or polymers of epoxy, urethane, silicone, polyester, and the like. Generally, the adhesive layer is a solventless layer, that is materials that are liquid at room temperature (about 25° C.), and are able to crosslink to an elastic, or rigid film to adhere at least two materials together. Specific adhesive layer components include 100 percent solids adhesives including polyurethane adhesives obtained from Lord Corporation, Erie, Pa., such as TYCEL® 7924 (viscosity from about 1,400 to about 2,000 cps), TYCEL® 7975 (viscosity from about 1,200 to about 1,600 cps), and TYCEL 7276. The viscosity range of the adhesives is, for example, from about 1,200 to about 2,000 cps. The solventless adhesives can be activated with either heat, room temperature curing, moisture curing, ultraviolet radiation, infrared radiation, electron beam curing, or any other known technique. The thickness of the adhesive layer is usually less than about 100 nanometers, and more specifically, for example, from about 1 to about 100 nanometers, from about 5 to about 75 nanometers, or from about 50 to about 100 nanometers.

The circumference of the intermediate transfer member, especially as it is applicable to a film or a belt configuration, is, for example, from about 250 to about 2,500 millimeters, from about 1,500 to about 2,500 millimeters, or from about 2,000 to about 2,200 millimeters with a corresponding width of, for example, from about 100 to about 1,000 millimeters, from about 200 to about 500 millimeters, or from about 300 to about 400 millimeters.

Throughout the disclosure and claims, the phrase "from about to about" includes all values therebetween, thus from about 1 to about 50 includes all numbers in between 1 and 50 like 1 to 10, 10 to 20, 20 to 30, 30 to 40, and 40 to 50, and more specifically, for example, 1 to 10 includes at least 1, 2, 3, 4, 5, 6, 7, 8, 9, and 10.

Specific embodiments will now be described in detail. These examples are intended to be illustrative, and are not limited to the materials, conditions, or process parameters set forth in these embodiments. All parts are percentages by weight of total solids unless otherwise indicated.

Example I

The cyclo olefin polymer (COP), ZEONOR® 1600R, a dicyclopentadiene polymer with a $T_g$ of about 163° C., as obtained from Zeon Corporation, was ball milled with a carbon black, color black FW-1 (B.E.T. surface area of 320 $m^2$/g, DBP absorption of 2.89 ml/g, primary particle diameter of 13 nanometers, from Evonik), in toluene/cyclohexane with a ratio of toluene to cyclohexane being 70/30. The resulting dispersion was coated on a PEN substrate, (KALEDEX™ 2000 having a thickness of 3.5 mils) using known draw bar coating methods, and then dried at 120° C. for 20 minutes. The dried film automatically released from the substrate, and the about 100 μm thick ITB device was obtained comprising ZEONOR® 1600R/color black FW-1 in a ration of 90/10.

Example II

The cyclo olefin polymer (COP), APEL™ APL6015T, an ethylene and norbornene copolymer with a $T_g$ of about 145° C., as obtained from Mitsui Chemical America, Inc., is ball milled with a carbon black, color black FW-1 (B.E.T. surface area of 320 $m^2$/g, DBP absorption of 2.89 ml/g, primary particle diameter of 13 nanometers, from Evonik), in toluene/cyclohexane with a ratio of toluene to cyclohexane being 30/70. The resulting dispersion is coated on a PEN substrate, (KALEDEX™ 2000 having a thickness of 3.5 mils) using known draw bar coating methods, and then dried at 120° C. for 20 minutes. The dried film automatically releases from the substrate, and the about 100 μm thick ITB device is obtained comprising APEL™ APL6015T/color black FW-1 in a ratio of 85/15.

Surface Resistivity Measurement

The above ITB member or device of Example I was measured for surface resistivity (averaging four to six measurements at varying spots, 72° F./65 percent room humidity) using a High Resistivity Meter (Hiresta-Up MCP-HT450 available from Mitsubishi Chemical Corp.).

The surface resistivity was about $1.6 \times 10^{10}$ ohm/square, within the functional range of an ITB of from about $10^9$ to about $10^{13}$ ohm/square.

Young's Modulus Measurement

The above ITB member or device of Example I was measured for Young's modulus following the ASTM D882-97 process. An Example I sample (0.5 inch×12 inch) was placed in the measurement apparatus, the Instron Tensile Tester, and then elongated at a constant pull rate until breaking. During this time, the instrument recorded the resulting load versus sample elongation. The modulus was calculated by taking any point tangential to the initial linear portion of this curve and dividing the tensile stress by the corresponding strain. The tensile stress was given by load divided by the average cross sectional area of the test specimen.

The Young's modulus of the Example I ITB device was measured to be about 2,700 MPa (Mega Pascal), within the reported modulus range of the thermoplastic ITBs on the market (from about 1,000 to about 3,500 MPa). Examples of these thermoplastic ITBs are polyester/carbon black ITB (Ricoh, Young's modulus of about 1,200 MPa), polyimide/carbon black ITB (Brother, Young's modulus of about 1,100 MPa), and polyimide/polyaniline ITB (Xerox, Young's modulus of about 3,500 MPa).

The disclosed cyclo olefin polymer ITB has excellent low water absorption (<0.01 percent) characteristics, thus it is believed to be dimensionally stable, which dimension does not change in humid environments. As a comparison, other common ITM polymers, such as polycarbonate, have a water absorption of about 0.22 percent, and polyethylene terephthalate has a water absorption of about 0.11 percent; therefore the dimension stability of these ITBs tends to increase in humid environments due to their unfavorable water absorption and water permeation characteristics.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a cyclo olefin thermoplastic polymer and an optional conductive component in the configuration of a polymer layer, an optional supporting substrate, and an optional outer release layer positioned on said polymer layer, the cyclo olefin thermoplastic polymer possessing a glass transition temperature of from about 70° C. to about 200° C., and wherein said cyclo olefin polymer is represented by the following formulas/structures

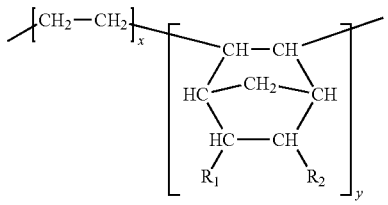

wherein each $R_1$ and $R_2$ is hydrogen, alkyl, or mixtures thereof; x is from about 1 to about 50 mole percent, and y is from about 50 to about 99 mole percent.

2. An intermediate transfer member in accordance with claim 1 wherein said cyclo olefin thermoplastic polymer possesses a glass transition temperature of from about 100° C. to about 160° C.

3. An intermediate transfer member in accordance with claim 1 wherein said cyclo olefin thermoplastic polymer has a water absorption of less than about 0.01 percent.

4. An intermediate transfer member in accordance with claim 1 wherein said cyclo olefin thermoplastic polymer is present in an amount of from about 40 to about 99 weight percent of total solids of said member components.

5. An intermediate transfer member in accordance with claim 1 wherein said cyclo olefin thermoplastic polymer is present in an amount of from about 60 to about 95 weight percent of total solids of said member components, and optionally wherein said member is a weldable belt.

6. An intermediate transfer member in accordance with claim 1 wherein said cyclo olefin thermoplastic polymer is present in an amount of from about 70 to about 90 weight percent of total solids.

7. An intermediate transfer member in accordance with claim 1 wherein said outer release layer is present.

8. An intermediate transfer member in accordance with claim 7 wherein said release layer comprises a fluorinated ethylene propylene copolymer, a polytetrafluoroethylene, a polyfluoroalkoxy polytetrafluoroethylene, a fluorosilicone, a terpolymer of vinylidene fluoride, hexafluoropropylene and tetrafluoroethylene, or mixtures thereof.

9. An intermediate transfer member in accordance with claim 1 wherein each $R_1$ and $R_2$ is alkyl containing from 1 to about 18 carbon atoms.

10. An intermediate transfer member in accordance with claim 1 wherein said supporting substrate is a polyimide, a polyamideimide, or a polyetherimide.

11. An intermediate transfer member in accordance with claim 1 wherein said conductive component is present in an amount of from about 1 to about 60 weight percent, and wherein said cyclo olefin thermoplastic polymer is present in an amount of from about 40 to about 99 weight percent; and wherein the total of said components is about 100 percent of total solids.

12. An intermediate transfer member in accordance with claim 11 wherein said conductive component is a carbon black, a polyaniline, or a metal oxide, each present in an amount of from about 3 to about 30 weight percent.

13. An intermediate transfer member in accordance with claim 1 wherein said cyclo olefin thermoplastic polymer has a water absorption of from about 0.001 to about 0.01 percent.

14. An intermediate transfer member in accordance with claim 1 wherein each $R_1$ and $R_2$ alkyl has from 1 to about 10 carbon atoms.

15. An intermediate transfer member in accordance with claim 1 wherein said cyclo olefin thermoplastic polymer is of a weight average molecular weight of from about 1,500 to about 5,000,000, and a number average molecular weight of from about 1,000 about to about 1,000,000.

16. An intermediate transfer member in accordance with claim 14 wherein said cyclo olefin thermoplastic polymer is of a weight average molecular weight of from about 15,000 to about 1,500,000, and a number average molecular weight of from about 10,000 to about 300,000.

* * * * *